United States Patent [19]

Maurer

[11] Patent Number: 4,595,551
[45] Date of Patent: Jun. 17, 1986

[54] THERMOFORMING OF STYRENIC FOAM LAMINATES

[75] Inventor: Richard P. Maurer, Wilbraham, Mass.

[73] Assignee: Monsanto Company, St. Louis, Mo.

[21] Appl. No.: 653,658

[22] Filed: Sep. 21, 1984

[51] Int. Cl.⁴ .................. B29C 67/22; B29C 51/14; B29C 51/42
[52] U.S. Cl. ..................... 264/321; 264/25; 264/257; 264/322
[58] Field of Search ............. 264/46.4, 46.8, 321, 264/322, 257, 25

[56] References Cited

U.S. PATENT DOCUMENTS

| | | | |
|---|---|---|---|
| 2,878,153 | 3/1959 | Hacklander | 264/46.4 X |
| 3,303,086 | 2/1967 | Demers | 161/159 |
| 3,355,535 | 11/1967 | Hain et al. | 264/321 |
| 3,531,367 | 9/1970 | Karsten | 161/160 |
| 3,565,746 | 2/1971 | Stevens | 161/160 |
| 3,654,063 | 4/1972 | Blackburn et al. | 161/125 |
| 3,787,259 | 1/1974 | Kleinfeld et al. | 156/78 |
| 3,817,818 | 6/1974 | Riding et al. | 161/89 |
| 3,833,259 | 9/1974 | Pershing | 297/452 |
| 4,065,596 | 12/1977 | Groody | 428/215 |
| 4,147,828 | 4/1979 | Heckel et al. | 428/255 |
| 4,167,824 | 9/1979 | Wolpa | 36/44 |
| 4,173,505 | 11/1979 | Jacobs | 264/46.8 X |
| 4,388,363 | 6/1983 | Fountain | 428/215 |
| 4,476,183 | 10/1984 | Holtrop et al. | 428/288 X |
| 4,489,126 | 12/1984 | Holtrop et al. | 428/286 X |
| 4,529,641 | 7/1985 | Holtrop et al. | 428/286 X |
| 4,531,994 | 7/1985 | Holtrop et al. | 156/307.7 X |

FOREIGN PATENT DOCUMENTS 2906259 8/1980 Fed. Rep. of Germany ... 428/319.7

Primary Examiner—Philip Anderson
Attorney, Agent, or Firm—Lawrence L. Limpus

[57] ABSTRACT

Thermoforming of styrenic foam laminates having at least one outer layer of polyurethane foam having an outer facing of decorative fabric. Prior to thermoforming the laminate is heated to at least the thermoforming temperature of the styrenic foam but to a temperature such that the decorative fabric is not degraded. The thermoforming process is useful in making automobile headliners.

14 Claims, 2 Drawing Figures

THERMOFORMING OF STYRENIC FOAM LAMINATES

This invention relates to thermoforming of styrenic foam laminates having at least one outer layer of urethane foam.

BACKGROUND OF THE INVENTION

Styrenic foam laminates have been used as acoustical and thermal insulation for a variety of applications, for instance as automobile headliners. Recent advances in this area have lead to the development of thermoformable styrenic foam laminates which can be provided in complex shapes. Such laminates are able to retain a desired shape because of the use of deformation-resistant coatings, for instance a polymer-impregnated fabric facing on at least one surface of the styrenic foam components. For illustrative laminates see U.S. patent applications Ser. Nos. 553,594 filed Nov. 17, 1983 and now U.S. Pat. No. 4,476,183; 553,462 filed Nov. 17, 1983 and now U.S. Pat. No. 4,489,126; 647,095, filed Sept. 4, 1984 and now U.S. Pat. No. 4,526,829; 647,096 filed Sept. 4, 1984 and now U.S. Pat. No. 4,531,994; 647,311 filed Sept. 4, 1984 and now U.S. Pat. No. 4,557,970; and 648,547 filed Sept. 7, 1984 and now U.S. Pat. No. 4,529,641 all of which are incorporated herein by reference.

To thermoform such laminates to useful shapes for acoustical and thermal insulation applications, the laminates are preheated to thermoforming temperatures of the styrenic foam components prior to thermoforming. Such preheating is generally effected as rapidly as possible, for instance by infrared radiation heaters, which may bring the surface temperatures of the laminates to temperatures as high as about 177° F. or higher. After such laminates are thermoformed into shapes for acoustical or thermal insulation applications, it is often desirable to provide a decorative trim to the exposed surface of the shaped laminate. For instance, when such thermoformed laminates are used for automobile headliners, a decorative trim, such as polyurethane foam covered with a decorative fabric or vinyl facing, is generally utilized for an enhanced aesthetic appearance. Because such layer of polyurethane foam faced with decorative fabric provides thermal insulation which would increase the time for preheating the styrenic foam thermoforming temperatures, decorative layers are applied to the laminate structures after thermoforming to the desired shape. Consideration of overcoming the adverse increase in heating time by applying heat from hotter sources, e.g. infrared radiation heaters, have been dismissed as impractical because the resulting higher surface temperatures would be expected to degrade the decorative trim e.g. often faced with nylon fabric.

I also believe that attempts have been made to thermoform thermosetting, phenolic resin-impregnated layers of fiberglass batting having decorative trim of urethane foam faced with fabric. I understand that such attempts have been unsuccessful because at thermoforming temperatures the uncured phenolic resin flows through the decorative trim resulting in stained and hardened trim.

An object of this invention is to provide a method for thermoforming styrenic foam laminates having an outer layer of decorative trim of urethane foam faced with a fabric.

A further object of this invention is to provide a method for such thermoforming which is free from undue delays in heating and thermoforming processes and which did not adversely affect the aesthetic appearance of the decorative trim.

These and other objects of this invention will be apparent from the following description and claims.

SUMMARY OF THE INVENTION

This invention provides a method of thermoforming laminates of at least one layer of styrenic foam wherein the laminate has an outer layer of urethane foam adhered to the at least one layer of styrenic foam. The method comprises heating such laminate to at least the thermoforming temperature of the styrenic foam followed by thermoforming the laminate. Preferably the outer layer of urethane foam has an outer facing of decorative fabric and the heating is such that the temperature at the outer surface of the decorative fabric is below the temperature at which the fabric degrades.

DESCRIPTION OF THE PREFERRED EMBODIMENTS

Figure 1:
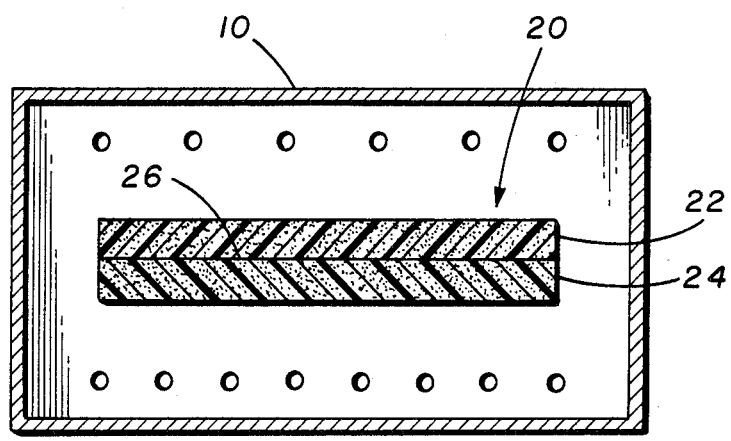
FIG. 1 is a cross-sectional representation of an oven which can be used to preheat a styrenic foam/polyurethane foam laminate in the method of applicant's invention.

This invention provides a method of thermoforming laminates comprising at least one layer of styrenic foam having one or two outer layers of urethane foam with an outer facing of decorative fabric. In some cases the laminate can comprise one layer of styrenic foam. In other cases the laminate can comprise multiple layers of styrenic foam and, optionally, with one or more layers of other polymeric foam material or other non-foam material. The styrenic foam can comprise polystyrene, styrene copolymers, such as styrene-maleic anhydride copolymer, styrene-acrylonitrile copolymer and the like. A number of useful laminates are described in U.S. patent application Ser. No. 553,594, filed Nov. 17, 1983 and now U.S. Pat. No. 4,476,183, incorporated herein by reference. A preferred laminate comprises in succession an outer layer of polystyrene foam, an inner layer of polyurethane foam, an inner layer of polystyrene foam and an outer layer of polyurethane foam faced with a decorative fabric.

The foam layers of the laminate can be of any thickness desired. Generally the foam layers will have a thickness in the range of from about 0.15 centimeters to 1.25 centimeters.

To enable the layers of styrenic foam to retain its thermoformed shape over a range of environmental conditions, e.g. temperatures up to about 75° C. and high humidity, it is desirable that at least one surface of said at least one ayer of styrenic foam have a deformation-resistant coating. In some cases such coating can comprise a dense layer of thermoplastic polymer, e.g. a styrenic polymer such as polystyrene, styrene copolymers such as styrene-maleic anhydride copolymer or styrene-acrylonitrile copolymer, and the like. In other cases such coating can comprise a thermoplastic polymer-impregnated fabric where the thermoplastic polymer has a high softening temperature, e.g. above about 75° C., as determined by thermomechanical analysis described in U.S. patent application Ser. No. 647,096, filed Sept. 4, 1984 and now U.S. Pat. No. 4,531,994, incorporated herein by reference. Such polymer may advantageously comprise acrylic polymers. The impregnated fabric can be woven or non-woven. Preferably non-woven synthetic fabrics of polyester, nylon or polyolefin are preferred.

The decorative fabric of the outer facing of the outer layer of urethane foam can be woven or non-woven and can comprise a number of materials, e.g. nylon, polyester, polyolefin, cotton and the like or blends of materials. A preferred fabric will have a napped, pile or velour surface. In some cases it may be desirable to substitute a vinyl sheet for the decorative fabric. When vinyl sheet is utilized heating may have to be extended at low temperatures to avoid degradation of the vinyl sheet.

Since thermoforming generally entails forming a heated laminate in a cooled mold, the laminate must of course be preheated to thermoforming temperatures. Such heating is generally affected by passing the laminates through a heater section in line with thermoforming molding apparatus. Such heating is generally required to be rapid to avoid delays in the thermoforming cycle. Such heating is often effected by infrared radiation heaters where high temperatures at the surface of the laminate are required to be conducted through the various layers of the laminate to raise the styrenic foam layers to thermoforming temperatures. Since such heating is desirably effected as rapidly as possible, surface temperatures of the laminate may reach adversely high levels, e.g. to the point of degrading the decorative fabric. High temperatures may also be required especially for laminates having large thickness of styrenic foam or multiple layers of styrenic foam. The potentially adverse use of high temperatures in heating laminates to avoid delays in thermoforming cycles can be avoided by preheating such laminates in ovens at low temperatures, e.g. about 121° C. Such ovens desirably provide indirect heating of the aminates over an extended period of time e.g., two to five minutes, or up to ten minutes or more. Heating to temperatures such that the decorative fabric is not degraded are of course desired.

For satisfactory thermoforming such laminates can be heated in many cases such that temperature at the interface of the outer layer of polyurethane and said styrenic foam is at least about 100° C. when the styrenic foam comprises polystyrene, at least about 105° C. when the styrenic foam comprises styrene-acrylonitrile copolymer, and at least about 115° C. when the styrenic foam comprises styrene-maleic anhydride copolymer.

Figure 2:
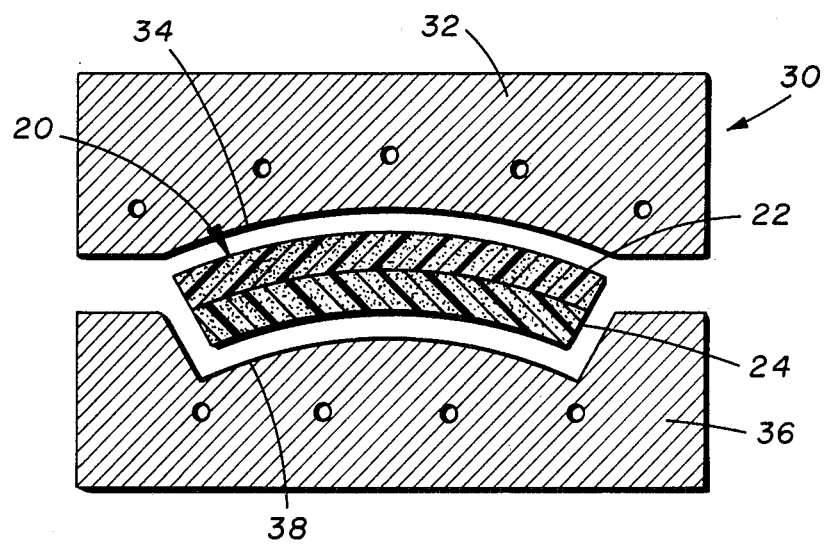
FIG. 2 is a cross-sectional representation of apparatus for thermoforming a preheated styrenic foam/polyurethane foam laminate in the method of applicant's invention.

Such preheating can be effected in an oven 10 as shown in FIG. 1, where a laminate 20 comprising a layer of polyurethane foam 22 adhered to a layer of polystyrene foam 24 is slowly preheated until the temperature at the interface 26 reaches at least 103° C. The preheated laminate can then be readily thermoformed in apparatus 30 as shown in FIG. 2, where an upper mold block 32 has an internal curved surface 34 and a lower mold block 36 has an internal curved surface 38.

The preheated laminate 20 is thermoformed to a shape defined by curved surfaces 34 and 38. Desirably, mold blocks 32 and 36 will be cooled by an outside source (not shown) to facilitate removing heat from the thermoformed laminate allowing the laminate to retain its thermoformed shape.

The following examples are provided to illustrate the specific embodiments and aspects of the method for thermoforming laminates of this invention but are not intended to imply any limitation of the scope of this invention.

EXAMPLE 1

This example illustrates a method of this invention where the laminate is preheated to thermoforming temperatures in a low temperature oven over an extended period of time.

A laminate was prepared comprising the following successively adhered layers:

Layer A—an outer layer of polystyrene foam, 0.36 centimeters thick, having a density of 55 kilograms per cubic meter, and having adhered to both surfaces an acrylic polymer-impregnated, non-woven, spunbonded, polyester fabric with a basis weight of 34 grams per square meter;

Layer B—an inner layer of polyurethane foam, 0.64 centimeters thick, and having a density of 18 kilograms per cubic meter;

Layer C—an inner layer of polystyrene foam, similar to layer A; and

Layer D—an outer layer of polyurethane foam, 0.38 centimeters thick, having a density of 25 kilograms per cubic meter, and having adhered to the outer surface of napped nylon fabric.

The laminate was heated in a 121° C. oven. The temperature at the interface of Layers C and D rose to 71° C. after two minutes, 88° C. after three minutes, and 104° C. after five minutes. With the interface temperature at 104° C. the laminate was readily thermoformed without further heating.

EXAMPLE 2

This example illustrates a method of this invention where the laminate is preheated to thermoforming temperatures by reduced output infrared radiation heaters over an extended period of time.

A laminate was prepared as in Example 1 and preheated for 70 seconds by reduced output infrared radiation heaters. After 70 seconds the top surface of the laminate, the decorative fabric facing of the polyurethane foam (layer D), reached a temperature of about 149° C., at which temperature the nylon fabric facing did not degrade. The lower surface of the laminate, the polymer impregnated fabric coating of the polystyrene foam (layer A), reached a temperature of about 143° C. The interface of Layers C and D reached a temperature of about 104° C. The laminate at such temperatures was readily thermoformed.

EXAMPLE 3

This example illustrates a further method of this invention.

A laminate was prepared comprising a layer of decorative fabric faced polyurethane foam (similar to layer D of Example 1) adhered to a layer of styrenemaleic anhydride copolymer foam, about 0.38 centimeters thick, and having adhered to both surfaces a dense (0.2 millimeter thick) layer of styrene-maleic anhydride copolymer.

The laminate was preheated to thermoforming temperatures by reduced output infrared radiation heaters for 60 seconds. The top surface of the laminate, the decorative fabric facing of the polyurethane foam, reached a temperature of about 177° C., at which temperature nylon fabric facing did not degrade. The bottom surface, the dense layer of styrene-maleic anhydride copolymer, reached a temperature of about 160° C. The interface between the polyurethane foam and the styrene-maleic anhydride copolymer foam reached a temperature of about 118° C. The laminate at such temperatures was readily thermoformed.

While specific embodiments of the invention have been described, it should be apparent to those skilled in the art that various modifications thereof can be made without departing from the true spirit and scope of the invention. Accordingly, it is intended that the scope of the following claims cover all such modifications within the full inventive concept.

I claim:

1. A method of thermoforming a laminate of at least one layer of styrenic foam, said laminate having an outer layer of polyurethane foam adhered to the at least one layer of styrenic foam, said method comprising:
   (a) heating said laminate to at least the thermoforming temperature of said styrenic foam, said temperature being at least about 100° C. at the interface of said styrenic foam and said outer layer of polyurethane foam and less than the temperature at which said polyurethane foam degrades, and
   (b) thermoforming said laminate.

2. The method of claim 1 wherein said outer layer of polyurethane foam has an outer facing of decorative fabric and further comprising heating said laminate to a temperature such that said fabric is not degraded.

3. The method of claim 2 wherein each of said styrenic foam layers has on at least one surface a facing comprising a thermoplastic polymer impregnated fabric.

4. The method of claim 2 wherein the styrenic foam comprises polystyrene.

5. The method of caim 4 wherein said laminate is heated such that the temperature at the interface of said outer layer of polyurethane and said styrenic foam is at least about 100° C.

6. The method of claim 2 wherein said styrenic foam comprises styrene-maleic anhydride copolymer.

7. The method of claim 6 wherein said laminate is heated such that the temperature of the interface of said polyurethane and said styrenic foam is at least about 115° C.

8. The method of claim 6 wherein each of said styrenic foam layers has on at least one surface a facing comprising a layer of dense styrenic polymer.

9. The method of claim 3 wherein the laminate comprises in succession an outer layer of styrenic foam, an inner layer of polyurethane foam, an inner layer of styrenic foam and an outer layer of polyurethane foam.

10. The method of claim 9 wherein the styrenic foam comprises polystyrene.

11. The method of claim 10 wherein said decorative fabric comprises a nylon fabric.

12. The method of claim 11 wherein said facing on said styrenic foam layers comprises an acrylic polymer impregnated non-woven fabric.

13. The method of claim 2 wherein the styrenic foam comprises styrene-acrylonitrile copolymer.

14. The method of claim 13 wherein said laminate is heated such that the temperature of the interface of said polyurethane and said styrenic foam is at least about 105° C.

* * * * *